US009573260B2

(12) United States Patent
Walters, Jr. et al.

(10) Patent No.: US 9,573,260 B2
(45) Date of Patent: Feb. 21, 2017

(54) FASTENING DEVICE FOR DRIVING DOUBLE-HEADED FASTENERS

(71) Applicants: Arthur R. Walters, Jr., Auburn, WA (US); Eric E. Brown, Everett, WA (US)

(72) Inventors: Arthur R. Walters, Jr., Auburn, WA (US); Eric E. Brown, Everett, WA (US)

( * ) Notice: Subject to any disclaimer, the term of this patent is extended or adjusted under 35 U.S.C. 154(b) by 215 days.

(21) Appl. No.: 13/889,992

(22) Filed: May 8, 2013

(65) Prior Publication Data

US 2014/0331474 A1 Nov. 13, 2014

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 16/00*** | (2006.01) |
| ***E21B 1/00*** | (2006.01) |
| ***B25C 1/00*** | (2006.01) |
| ***B25C 5/16*** | (2006.01) |

(52) U.S. Cl.
CPC ............. *B25C 1/005* (2013.01); *B25C 5/1658* (2013.01); *Y10T 29/49833* (2015.01)

(58) Field of Classification Search
CPC .................................. B25C 1/005; B25C 1/00
USPC .................................................. 227/120–155
See application file for complete search history.

(56) References Cited

U.S. PATENT DOCUMENTS 633,242 A * 9/1899 Hayes .......................... 411/475
2,867,807 A * 1/1959 Anstett ............... F16B 15/0015 206/340
2,874,603 A * 2/1959 Boettcher ..................... 411/482
3,060,440 A * 10/1962 De Caro et al. .............. 227/147
3,099,108 A * 7/1963 Kalkbrenner ......... E04B 1/4171 411/386
3,137,858 A * 6/1964 Powers .................. F16B 15/08 206/344
3,693,496 A * 9/1972 Koide .......................... 411/458
3,696,701 A * 10/1972 Readyhough ................. 206/343
3,828,924 A * 8/1974 Perkins .................. F16B 15/08 206/343
3,980,179 A * 9/1976 Schrepferman ............... 206/338
(Continued)

OTHER PUBLICATIONS

Bostitch®, "RN90PLEX: Pneumatic Stick Nailer," Stanley Fastening Systems L.P., Operation and Maintenance Manual, Retrieved on Aug. 19, 2014, from URL:http://documents.dewait.com/documents/English/Instructions%20Manual/Bostich/104937reve,RN90PLEX.pdf, 14 pages.
(Continued)

*Primary Examiner* — Robert Long
(74) *Attorney, Agent, or Firm* — Seed IP Law Group LLP

(57) ABSTRACT

An automatic fastening device includes a driving mechanism for driving a double-headed fastener and a magazine for receiving and delivering the double-headed fastener to the driving mechanism. The magazine includes a first channel that receives a first head of the fastener and a second channel that receives a second head of the same fastener. The first and second channels guide the fastener along the magazine and toward an actuation component of the driving mechanism for driving the fastener into an object. A plurality of double-headed fasteners are inserted into the magazine, guided by the magazine to the driving mechanism, and driven one at a time into an object such that the first head of the fasteners extends from the object for easy removal of the fasteners.

10 Claims, 8 Drawing Sheets

(56) References Cited

U.S. PATENT DOCUMENTS

| | | | | | |
|---|---|---|---|---|---|
| 3,983,995 | A | * | 10/1976 | Readyhough | 206/343 |
| 4,002,098 | A | * | 1/1977 | Colechia | 411/443 |
| 4,011,785 | A | * | 3/1977 | Schrepferman | 411/545 |
| 4,106,618 | A | * | 8/1978 | Haytayan | F16B 15/08 |
| | | | | | 206/343 |
| 4,122,583 | A | * | 10/1978 | Grittner | B60R 13/0206 |
| | | | | | 24/297 |
| 4,168,520 | A | * | 9/1979 | Coleman et al. | 361/308.1 |
| RE30,617 | E | * | 5/1981 | Butler et al. | B25C 1/188 |
| | | | | | 227/10 |
| 4,377,358 | A | * | 3/1983 | Wollar | 411/15 |
| 4,403,893 | A | * | 9/1983 | Wollar | 411/38 |
| 4,534,501 | A | * | 8/1985 | Berns | A41H 9/02 |
| | | | | | 222/65 |
| 4,570,839 | A | * | 2/1986 | Cox | B23P 19/062 |
| | | | | | 227/1 |
| 4,610,250 | A | * | 9/1986 | Green | A61B 17/0643 |
| | | | | | 411/450 |
| 4,684,050 | A | * | 8/1987 | Masas | 227/10 |
| 4,718,210 | A | * | 1/1988 | McCourt et al. | 52/309.12 |
| 4,809,849 | A | * | 3/1989 | Kozyrski | B25C 1/02 |
| | | | | | 206/343 |
| 4,815,647 | A | * | 3/1989 | Chou | B25C 1/005 |
| | | | | | 227/109 |
| 4,815,909 | A | * | 3/1989 | Simons | B21H 3/027 |
| | | | | | 411/392 |
| D300,508 | S | * | 4/1989 | Viening | D8/391 |
| 4,826,381 | A | * | 5/1989 | Kiriyama | 411/443 |
| 4,836,372 | A | * | 6/1989 | Shelton | B25C 1/003 |
| | | | | | 206/343 |
| 4,903,851 | A | * | 2/1990 | Slough | 220/3.9 |
| 4,930,674 | A | * | 6/1990 | Barak | A61B 17/072 |
| | | | | | 227/179.1 |
| 5,154,670 | A | * | 10/1992 | Sygnator et al. | 470/125 |
| D357,855 | S | * | 5/1995 | Keith | D8/384 |
| 5,452,796 | A | * | 9/1995 | Ohuchi | 206/347 |
| 5,482,419 | A | * | 1/1996 | Leistner | 411/442 |
| 5,588,788 | A | * | 12/1996 | Dominguez | 411/482 |
| 5,615,819 | A | * | 4/1997 | Hou | B25C 5/1651 |
| | | | | | 227/109 |
| 5,615,985 | A | * | 4/1997 | Rose et al. | 411/442 |
| 5,632,431 | A | * | 5/1997 | Lin | B25C 1/005 |
| | | | | | 227/109 |
| 5,641,110 | A | * | 6/1997 | Yang | B25C 1/005 |
| | | | | | 227/109 |
| 5,685,682 | A | * | 11/1997 | Glime | F16B 21/082 |
| | | | | | 411/510 |
| 5,695,108 | A | * | 12/1997 | Lee | B25C 5/1644 |
| | | | | | 227/109 |
| 5,943,926 | A | * | 8/1999 | Habermehl | 81/434 |
| 5,971,688 | A | * | 10/1999 | Anstett | B25C 1/00 |
| | | | | | 411/442 |
| 6,062,789 | A | * | 5/2000 | Pope | E04F 13/0864 |
| | | | | | 411/480 |
| 6,145,725 | A | * | 11/2000 | Omli | B25C 5/1693 |
| | | | | | 227/120 |
| 6,387,113 | B1 | * | 5/2002 | Hawkins | A61B 17/064 |
| | | | | | 227/180.1 |
| 6,387,114 | B2 | * | 5/2002 | Adams | A61B 17/064 |
| | | | | | 606/220 |
| 6,641,021 | B2 | * | 11/2003 | Jablonski | B25C 1/184 |
| | | | | | 227/109 |
| 6,658,806 | B1 | * | 12/2003 | Leek | E04B 1/41 |
| | | | | | 248/220.31 |
| 6,659,700 | B1 | * | 12/2003 | Farrell et al. | 411/450 |
| 6,679,412 | B1 | * | 1/2004 | Thomas | B25B 23/045 |
| | | | | | 227/119 |
| 6,783,048 | B2 | * | 8/2004 | Powell | 227/113 |
| 6,851,595 | B1 | | 2/2005 | Lee | |
| 7,086,573 | B1 | * | 8/2006 | Wen | 227/8 |
| D564,345 | S | * | 3/2008 | Prada | D8/391 |
| 7,344,058 | B2 | * | 3/2008 | Bruins et al. | 227/18 |
| D567,074 | S | * | 4/2008 | Gallien | D8/387 |
| 7,398,905 | B2 | * | 7/2008 | Chen et al. | 227/119 |
| 7,617,883 | B1 | * | 11/2009 | Mangone, Jr. | 173/1 |
| 7,713,013 | B2 | * | 5/2010 | Sedgwick et al. | 411/411 |
| 7,758,612 | B2 | * | 7/2010 | Shipp | 606/219 |
| 8,074,854 | B2 | * | 12/2011 | Hu | B25C 5/11 |
| | | | | | 227/130 |
| 8,413,740 | B2 | * | 4/2013 | Rodenhouse | 173/29 |
| 8,602,285 | B2 | * | 12/2013 | Santamarina et al. | 227/139 |
| 8,663,192 | B2 | * | 3/2014 | Hester | A61B 17/06166 |
| | | | | | 604/514 |
| 9,121,427 | B2 | * | 9/2015 | Young | F16B 15/0015 |
| 2002/0060233 | A1 | | 5/2002 | Akiba | |
| 2003/0032961 | A1 | * | 2/2003 | Pelo | A61F 2/0063 |
| | | | | | 606/232 |
| 2004/0052611 | A1 | * | 3/2004 | Liu | 411/508 |
| 2004/0118720 | A1 | * | 6/2004 | Powers et al. | 206/346 |
| 2005/0053448 | A1 | * | 3/2005 | Lat | B25C 5/0257 |
| | | | | | 411/470 |
| 2006/0089525 | A1 | * | 4/2006 | Mamo | A61B 17/0401 |
| | | | | | 600/37 |
| 2007/0164075 | A1 | * | 7/2007 | Chen et al. | 227/119 |
| 2007/0246502 | A1 | * | 10/2007 | Liu | B25C 5/161 |
| | | | | | 227/120 |
| 2008/0067089 | A1 | * | 3/2008 | Zhu | B25C 5/1651 |
| | | | | | 206/340 |
| 2008/0067212 | A1 | * | 3/2008 | Wen | B25C 1/005 |
| | | | | | 227/120 |
| 2008/0264999 | A1 | * | 10/2008 | Lee | B25C 5/1658 |
| | | | | | 227/109 |
| 2009/0165319 | A1 | * | 7/2009 | Gallien | A47G 1/205 |
| | | | | | 33/666 |
| 2011/0087277 | A1 | * | 4/2011 | Viola | A61B 17/0057 |
| | | | | | 606/219 |
| 2011/0180583 | A1 | * | 7/2011 | Wang | B25C 5/1644 |
| | | | | | 227/109 |
| 2013/0181028 | A1 | * | 7/2013 | Wu | 227/109 |
| 2013/0221056 | A1 | * | 8/2013 | Chen | B25C 5/162 |
| | | | | | 227/120 |

OTHER PUBLICATIONS

International Search Report, mailed Sep. 5, 2014, for International Application No. PCT/US2014/035359, 2 pages.

Senco SLP20XP 18 Gauge Brad Nailer, Parts Reference Guide, NFG043 Feb. 15, 2016, found at http://www.senco.com/docs/manuals-and-parts-charts/SLP20XP_PC.pdf 4 pages.

Senco SLP 20XP Operating Instructions NFD843, Issued Jan. 8, 2007, found at http://www.senco.com/docs/manuals-and-parts-charts/SLP20XP_MAN.pdf 8 pages.

Hitachi Pneumatic Tool Parts List, Strip Nailer, Model NR 65AK, Sep. 14, 2001, found at http://www.hitachipowertools.ca/upload/fmproduct_filen/NR65AK_BD_6377.pdf 4 pages.

Hitachi Koki Instruction and Safety Manual, Model NR 65 AK and NR 65AK (S) found at http://www.hitachipowertools.ca/upload/fmproduct_filen/NR65AK_NR65AK_S_OM_6376.pdf 52 pages.

* cited by examiner

FASTENING DEVICE FOR DRIVING DOUBLE-HEADED FASTENERS

BACKGROUND

Technical Field

The present disclosure relates generally to fastening devices, and more particularly, to an automatic fastening device drives double-headed fasteners.

Description of the Related Art

Double-headed fasteners (or "duplex nails") have been used for many years in applications where it is desirable to later remove the fasteners from objects. For example, thousands of double-headed fasteners are manually driven through wood boards/panels when creating forms for a concrete structure. The outer heads of the double-headed fasteners will protrude from the wood boards/panels for easy removal of the double-headed fasteners a later time, such as after concrete has cured adjacent the boards/panels. Manually driving thousands of double-headed fasteners into wood boards/panels or other objects is very time consuming and inefficient.

Power fastener devices, such as electric, pneumatic, and fuel cell types, have been known for many years. These fastener devices typically include a magazine that is adapted to hold a strip of nails which can be driven one at a time as the strip is advanced through a drive head and engaged by a reciprocating knife or hammer. These magazines are adapted to hold a single-headed nail. Thus, workers are required to manually drive thousands of double-headed fasteners without the aid of a power fastening device.

Currently, nail guns used to build homes and other construction projects are typically pneumatic. A pneumatic nail gun has a long hose connected to an air compressor that provides the compressor air. This hose must be connected to the nail gun at all times. If the pneumatic nail gun is being used around concrete construction, there are many protruding rebars, spikes and other hard items on which the hose might be caught or punctured. Dragging a pneumatic hose around a concrete construction building in which duplex nails are often used is dangerous and may result in damage to either the pneumatic hose system or the user.

Another disadvantage of pneumatic hose nail guns is their limited power. An air compressor must deliver compressed air through a long hose and the amount of drive power is limited based on the compressor pressure and the amount of pressure that can be held in the hose system. As a result, a pneumatic system has trouble driving even 8 d nails.

A duplex nail has particular technical issues for being driven a full depth of the first head because power can only be applied to the second head. The driving force must be transmitted from the second head through the shaft and to the first head. The head being driven to be flush with the top surface is not directly impacted by the driving hammer, but rather, the second head is driven.

Accordingly, the inventors realized that it would be beneficial to have a compressed gas cartridge type of nail gun to drive a duplex nail.

BRIEF SUMMARY

According to one aspect of the present disclosure, a fastening device, such as a nail gun, drives a double-headed fastener into an object. The fastening device includes a driving mechanism for driving the fastener and a magazine attached to the driving mechanism that receives the fastener. The magazine includes a first channel that at least partially receives a first head of the fastener and a second channel that at least partially receives a second head of the same fastener. The first and second channels guide the fastener along the magazine and toward an actuation component of the driving mechanism for driving the fastener into an object.

In some aspects, the fastening device includes a nose portion that has an opening positioned adjacent a supply end of the magazine. The opening has a duplex opening sized to receive the double-headed fastener and to position the fastener proximate and in-line with the actuation component for driving the fastener into an object.

A plurality of double-headed fasteners are inserted into the magazine. The plurality of double-headed fasteners, each having first and second heads, are slidably engaged to the first and second channels of the magazine, respectively. The fastener enters the nose of the nail gun via a specially sized duplex opening which ensures the fastener is properly fed into the nail gun such that the fastener is always ensured of being properly aligned for being driven. One of the double-headed fasteners is positioned proximate the actuation component of the automatic fastening device. The nose section of the automatic fastening device is biased against an object to receive the fastener. A trigger is pulled (or other device is actuated) to cause rapid movement of the actuation component toward the fastener, thereby causing impact against the fastener. The fastener is thereby expelled from the automatic fastening device at a high velocity and is at least partially driven into the object. Importantly, the first head of the fastener will at least partially extend from the object so that the fastener may be easily removed at a later time. The fastening device is used repeatedly until all of the fasteners in the magazine are depleted, and then additional fasteners may be inserted into the magazine and driven into an object.

DETAILED DESCRIPTION

Figure 1:
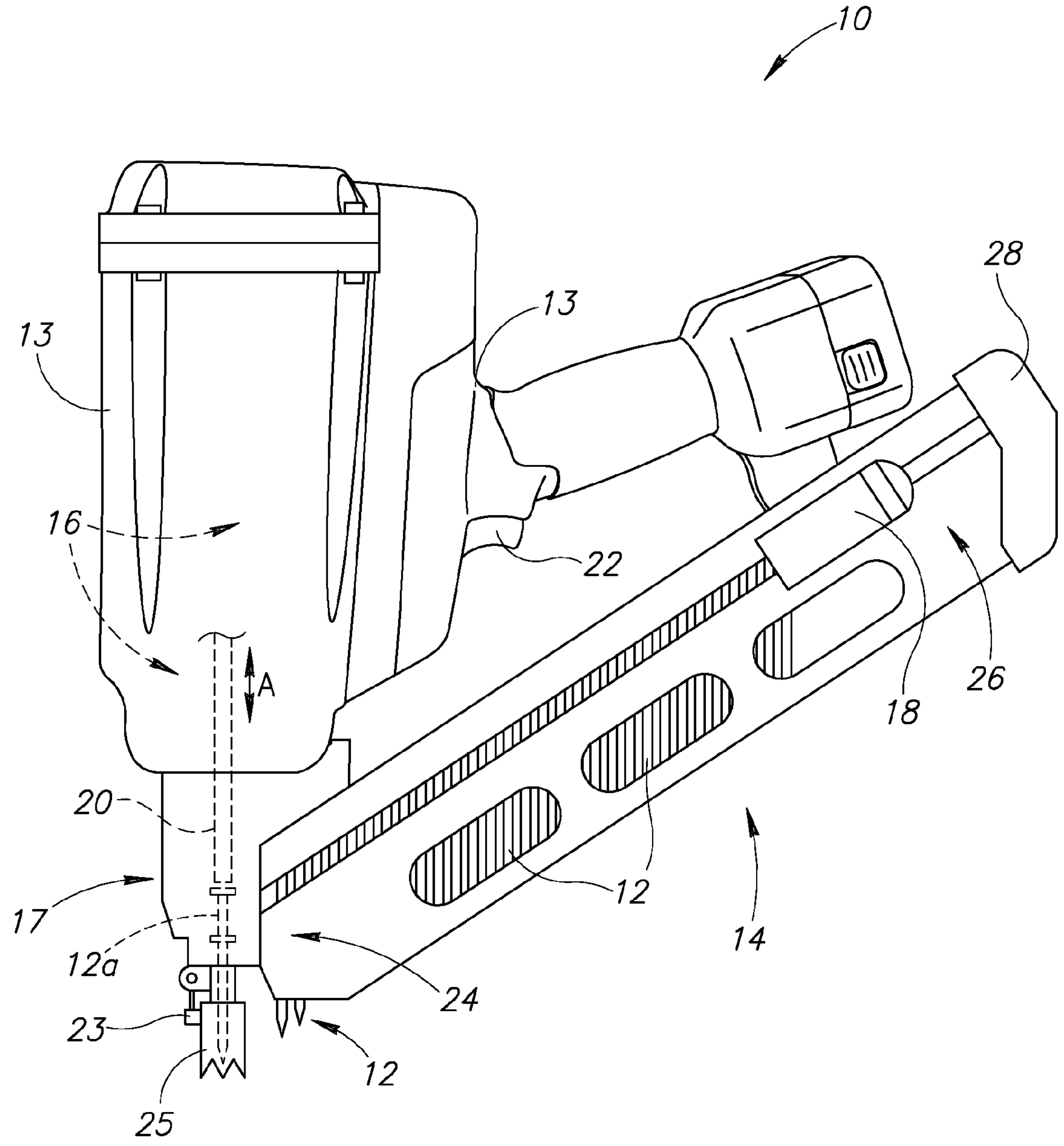
FIG. 1 is a side view of a compressed gas, fuel cell fastening device capable of driving a double-headed fastener, according to an embodiment of the present disclosure.

FIG. 1 shows an automatic fastening device 10 according to one embodiment. The automatic fastening device 10 is of the compressed gas type which uses a fuel cell cartridge of highly compressed gas that ignites. Such a compressed gas fastener is fully portable. It has no hose, power lines or other connections. The user is able to easily carry the fully portable compressed gas fuel cell fastening device to any floor in the building and any location without the safety problems posed by a pneumatic device with its hose. One type of fastening device sold on the market today is the Senco GT90. Others include the Hitachi NC40, the Paslode 902600, and the like. These fuel cell gas nail guns as the starting machine must be modified as taught herein to have two spaced apart, specifically located and sized channels to receive each head of a duplex nail and also sized to receive the specially designed magazine as describe herein with respect to this invention.

Figure 2A:
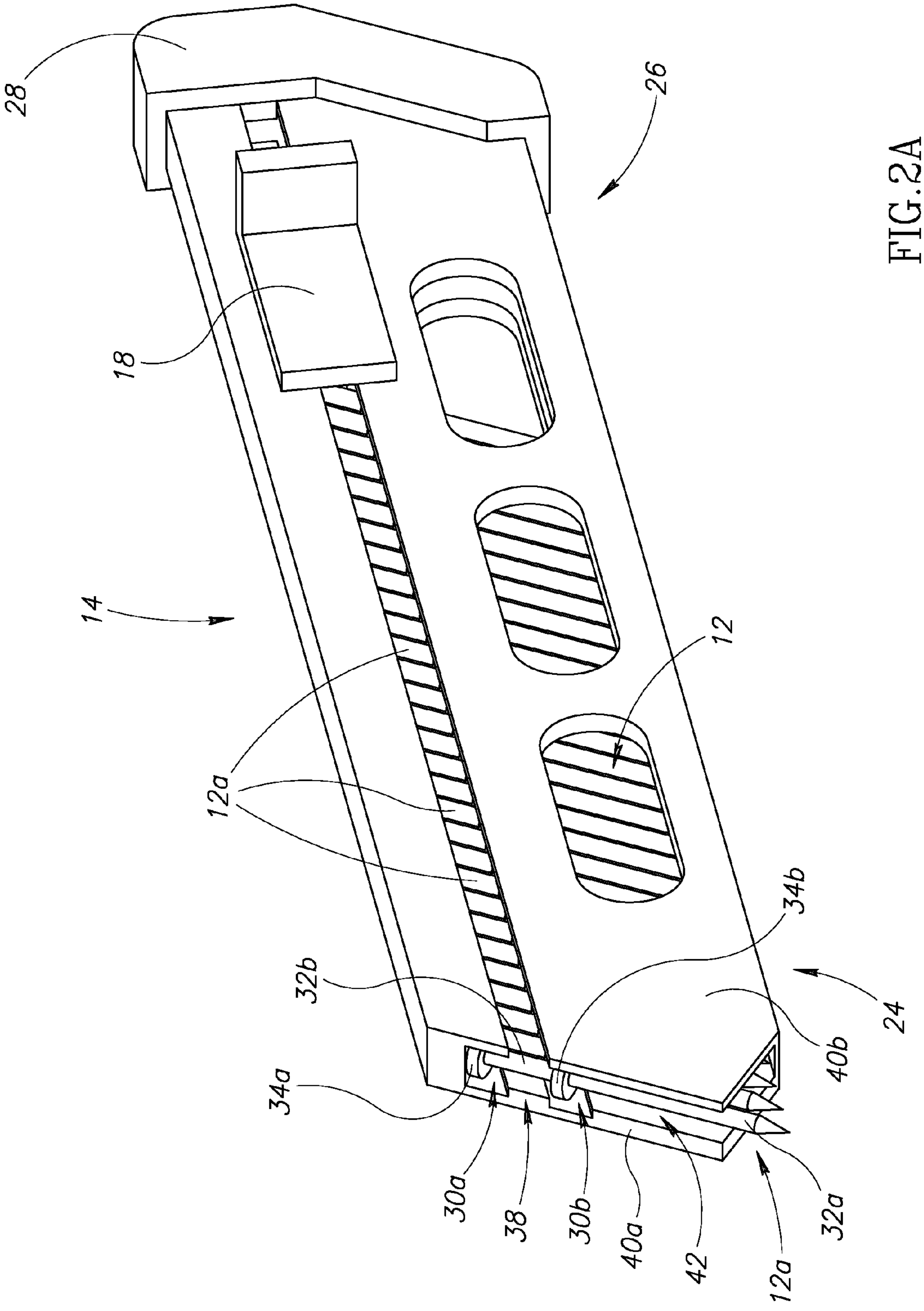
FIG. 2A is an isometric view of a magazine capable of receiving and delivering a double-headed fastener, according to an embodiment of the present disclosure.
Figure 2B:
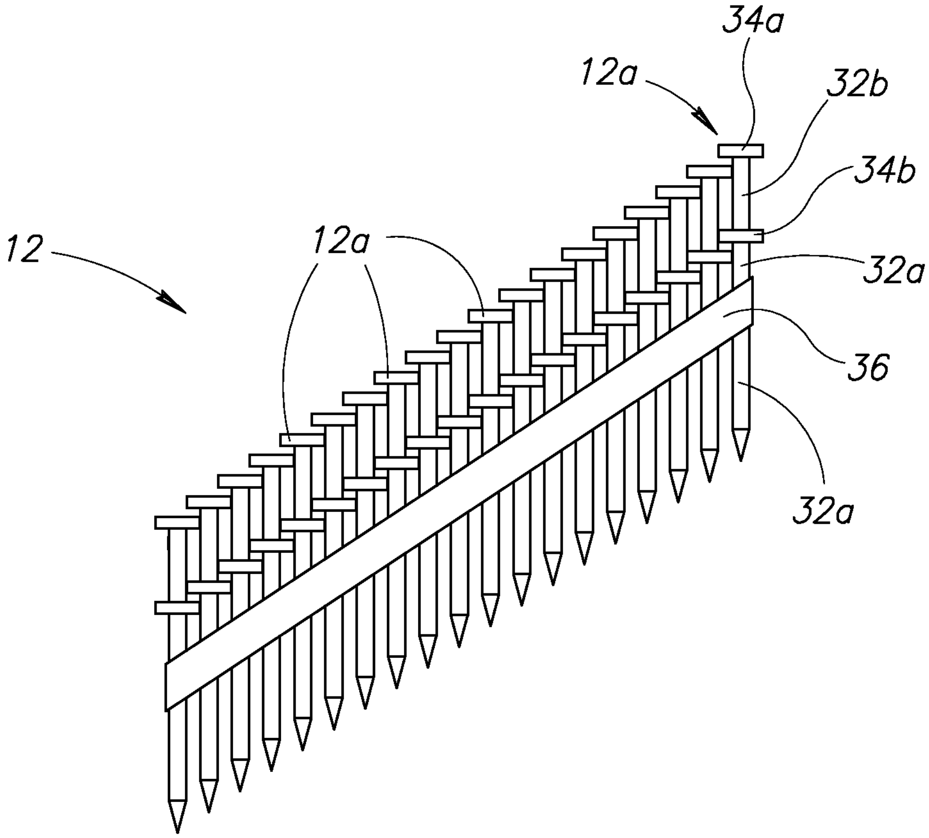
FIG. 2B is a side view of a strip of double-headed fasteners receivable by the magazines of FIGS. 1 and 2.

The automatic fastening device 10 receives and drives double-headed fasteners 12*a* into an object one at a time, such as from a strip 12 of double-headed fasteners 12*a* shown in FIG. 2B. FIG. 1 shows one double-headed fastener 12*a* as shadow lines at a position ready to be driven into an object to the depth of its first head.

The double-headed fasteners are usually nails, but other types of fasteners that have two heads, one spaced vertically above the other, can also be used with this device. These are sometimes called duplex nails.

The automatic fastening device 10 includes a housing 13 and a magazine 14 attached to the housing 13. The housing 13 contains a driving mechanism 16 for driving the fastener 12*a* delivered by the magazine 14. The driving mechanism 16 includes a nose section 17 that receives and positions the fastener 12*a* from the magazine 14. The magazine 14 includes a biasing mechanism 18 slidably coupled to the magazine 14. The biasing mechanism 18 biases the fasteners 12 toward the nose portion 17 of the driving mechanism 16. Such biasing mechanisms may include a spring and are well known in the art.

The driving mechanism 16 includes an actuation component 20 and a trigger 22. The trigger 22 is operable by an operator to cause the actuation component 20 to rapidly impact the fastener 12*a* for driving into an object. The automatic fastening device 10 is preferably a compressed gas nail gun that drives the fasteners 12. Such a nail gun has particular benefits over a pneumatic nail gun which has the long hose, as explained herein. Such an automatic fastening devices is an actuation component 20 (such as a blade or hammer) that is caused to rapidly impact one fastener 12*a* at a time of a strip of fasteners 12 delivered by the magazine 14, for example. The actuation component 20 is movable in a direction depicted by Arrow A. An adjustment mechanism 23 is attached to the nose section 17 and is adjustable to control the depth fastener 12*a* is driven into the object being nailed. A contact head 25 is attached to the nose section 17 and is biasable to an object that the fastener 12*a* is driven into. Driving components of automatic fastening devices are well known and will not be described in greater detail.

The magazine 14 includes a supply output end 24 and a receiving end 26. The supply end can also be called the outlet end because the fasteners are output at that end and the receiving end can be termed the inlet end since the fasteners are input at that end. The supply end 24 is attached to the nose section 17. The receiving end 26 receives a strip of fasteners 12 and the supply end 24 supplies the fastener 12*a* to the nose section 17 and proximate the actuation component 20. Attached to the receiving end 26 is a receiving component 28 that receives a strip of fasteners 12; the strip is typically inserted by hand. The magazine 14 is an elongated body, but it may be a coil-type magazine or other magazine having similar first and second ends 24, 26 for receiving and supplying fasteners 12 to a fastening device.

Figure 3A:
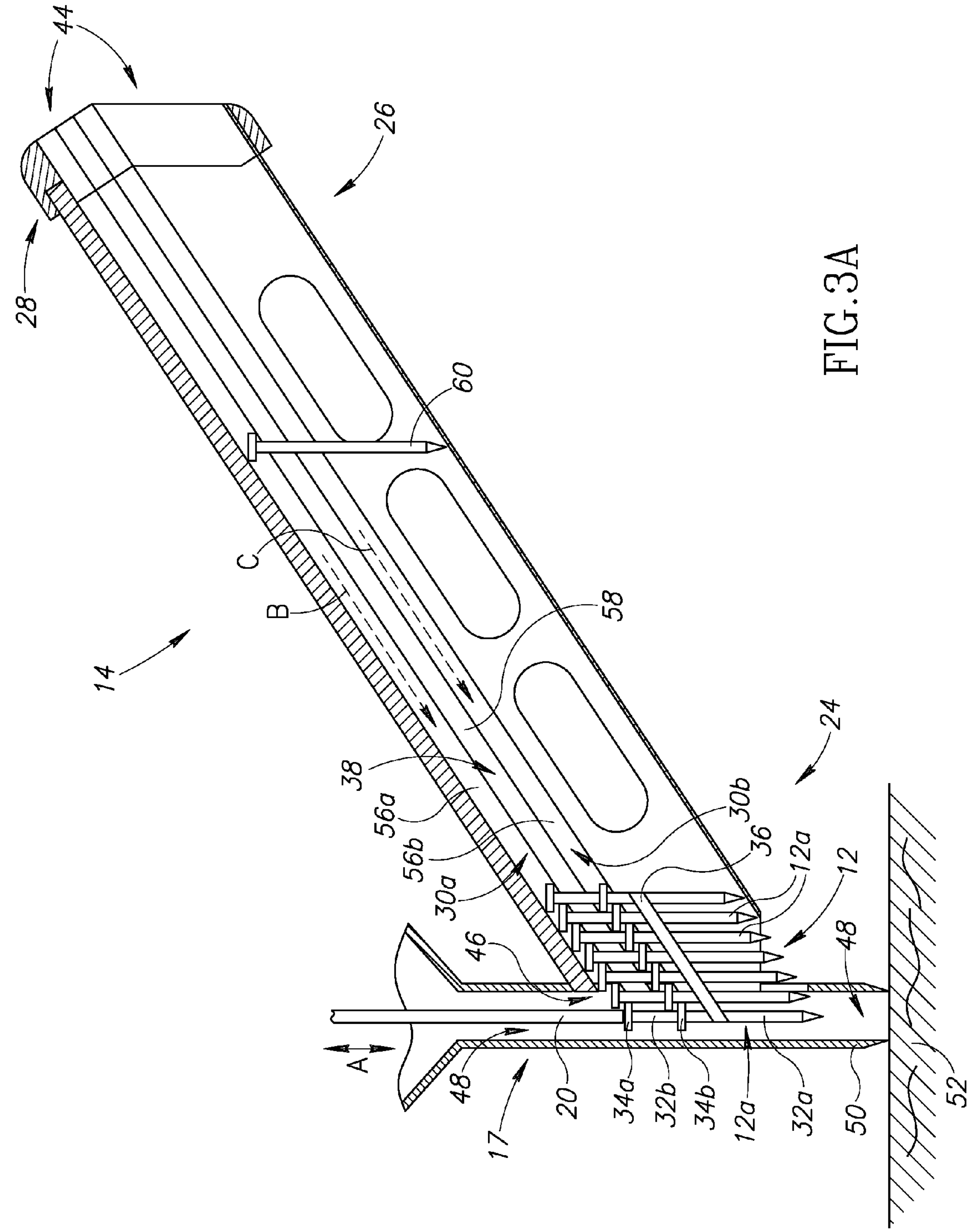
FIG. 3A is a cross-sectional view of certain components of the fastening device of FIG. 1.

FIG. 2A shows an isometric view of a magazine 14 according to one embodiment. The magazine 14 includes a first channel 30*a* and a second channel 30*b* that each extend a length of the magazine 14 (FIG. 3A). The first channel 30*a* and the second channel 30*b* are sized to receive and guide double-headed fasteners 12*a*.

FIG. 2B shows a strip 12 of such fasteners 12*a*. Each fastener 12*a* includes a primary shank 32*a* and a secondary shank 32*b*. Each fastener 12*a* includes a first head 34*a* and a second head 34*b*. The primary shank 32*a* is the portion of the fastener 12*a* that is driven into an object. The secondary shank 32*b* is the portion that is separated by the first head 34*a* and the second head 34*b*. The fasteners 12*a* are temporarily attached to each other in the collection of fasteners 12 by a breakable strip 36 that attaches the fasteners 12*a* to each other in a staggered manner, which is well known in the art.

Accordingly, and with reference to FIGS. 2A and 3A, the first channel 30*a* at least partially receives the first head 34*a* of the fastener 12*a* and the second channel 30*b* at least partially receives the second head 34*b* of the fastener 12*a* when the strip 12 of fasteners 12*a* is positioned along the magazine 14.

Figure 6A:
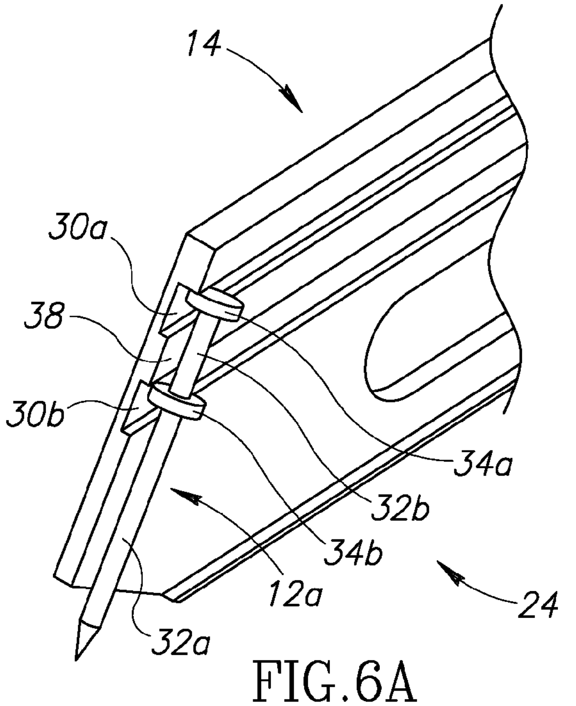
FIG. 6A is a partial isometric view a magazine according to an embodiment of the present disclosure.

The magazine 14 includes a support portion 38 disposed between the first and second channels 30*a*, 30*b* and that extends a length of the magazine 14 (FIGS. 3A and 6A). The secondary shank 32*b* of the fastener 12*a* is slidably biased to the support portion 38 for additional guidance support for the fasteners 12*a* as they travel a length of the magazine 14. It will be appreciated that not all fasteners 12*a* will slide along the support portion 38 because of the differences in tolerances among various strips of fasteners.

The magazine 14 further includes a first frame portion 40*a* and a second frame portion 40*b* that are each disposed on either side of the magazine 14. The first frame portion 40*a* and the second frame portion 40*b* define a shank slot 42 that receives the primary shank 32*a* of the fasteners 12. In some embodiments, only a first frame portion 40*a* is provided and the biasing mechanism 18 acts to bias the fasteners 12 against the first frame portion 40*a*.

In the example shown in FIGS. 2A and 3A, the first channel 30*a* and the second channel 30*b* are spatially separated from each other and are sized to receive and guide the strip 12 for driving fasteners 12*a* into an object one at a time (FIG. 3A), as discussed above. In other embodiments, such as shown in FIGS. 6A, 6B, 7A, 7B, 8A, and 8B, magazines of the present disclosure may include various cross-sectional configurations and areas to guide the fasteners 12*a* along the respective magazines, as will be further described below. It will be appreciated that various magazine shapes and sizes could be (and are) used in the industry. One advantage of the present invention is a magazine having the capability of receiving and supplying double-headed fasteners to a driving component.

Figure 4:
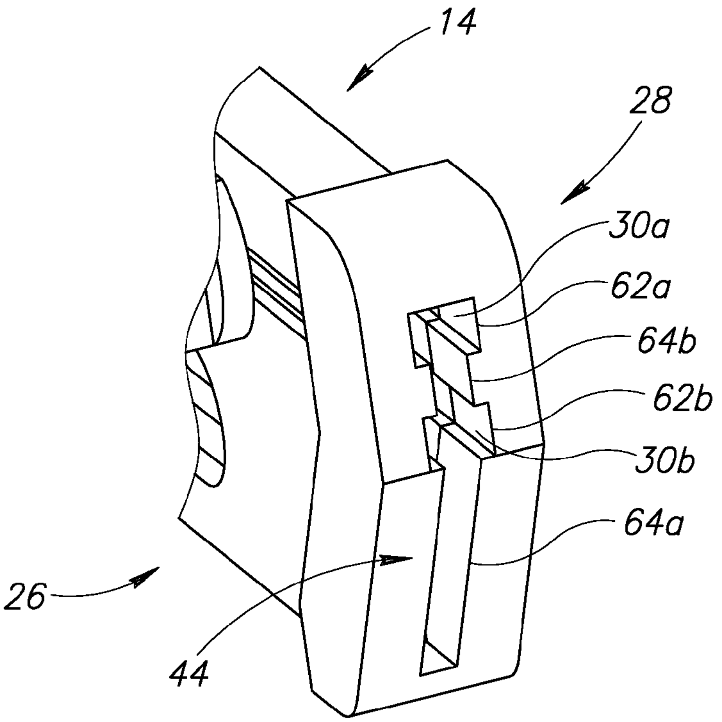
FIG. 4 is an isometric view of the receiving component of FIG. 3A according to an embodiment of the present disclosure.

FIG. 3A shows a cross-sectional view of the magazine 14, the receiving component 28, and the nose portion 17, as also discussed above. The receiving component 28 is attached to the receiving end 26 of the magazine 14. The strip 12 of fasteners 12*a* is inserted by hand into the receiving component 28. Accordingly, the receiving component 28 includes an opening 44 that receives the fasteners 12*a* (FIG. 4).

Figure 5:
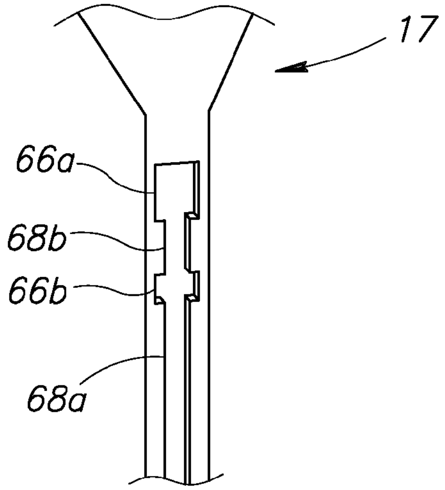
FIG. 5 is a partial isometric view of the nose section of FIG. 3A according to an embodiment of the present disclosure.

As shown in FIG. 5, the nose section 17 of the fastening device 10 is attached to the supply end 24 of the magazine 14 and also includes an opening 46 that receives the fasteners 12*a* from the magazine 14. The nose section is specifically formed to have a shape and size to receive the duplex nails. The nose section 17 is shown here as a specific, unitary component for purposes of illustration.

The nose section 17 has an elongated chamber 48 that receives a fastener 12*a* of the strip 12 of fasteners 12*a* from the magazine 14. The elongated chamber 48 allows at least a portion of the actuation component 20 to travel therethrough in directions depicted by Arrow A. The elongated chamber 48 is sized to facilitate spatial positioning of the fastener 12*a* in the path of the actuation component 20. The breakable strip 36 assists to spatially position each fastener 12*a* one at a time within the chamber 48. The nose section 17 further includes a contact head 50 that is positionable against an object 52 (such as wood or other building material). Once the contact head 50 is biased against the object 52, a trigger 22 is pulled by an operator, which causes the actuation component 20 to rapidly travel through the elongated chamber 48 and impact the first head 34*a* of the fastener 12*a*. The fastener 12*a* is then detached from the strip 12 and is expelled out from the nose section 17 and into the object 52.

Figure 3B:
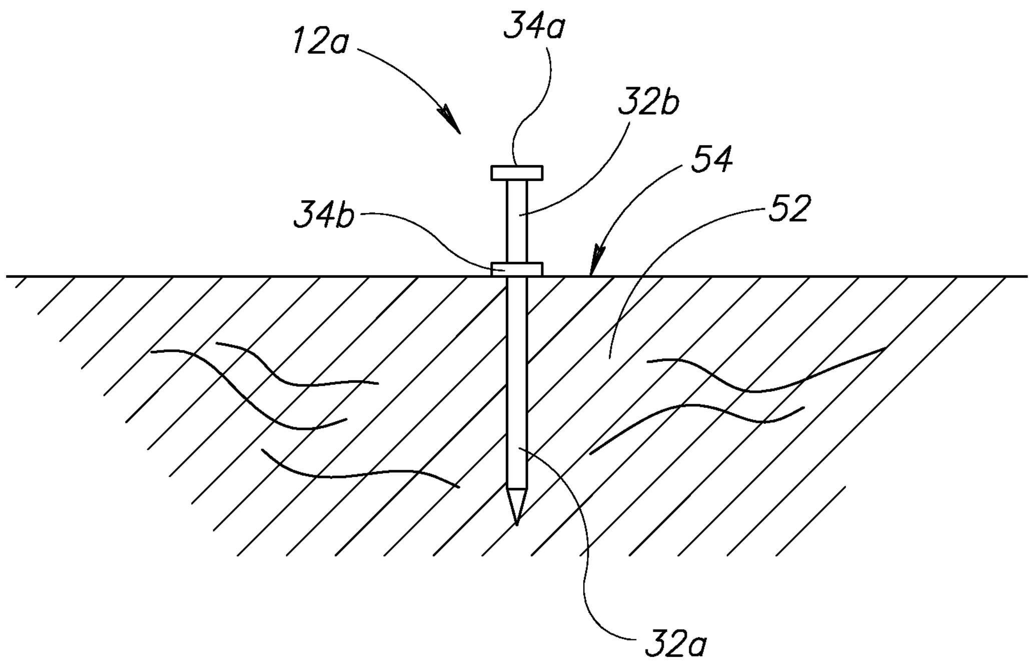
FIG. 3B is a cross-sectional view of a fastener partially extending from an object.

As shown in FIG. 3B, the automatic fastening device 10 drives the fastener 12*a* into the object 52 such that the secondary shank 32*b* and the first head 34*a* extend from a surface 54 of the object 52. Preferably, the second head 34*b* stops the travel of the fastener 12*a* through the object 52. Accordingly, a hand tool or other tool may be used to remove the fastener 12*a* from the object 52 at a later time by using the first head 34*a* as a means of pulling out the fastener 12*a* from the object 52. The particular depth of the fastener 12*a* into the object 52 may be controlled with the adjustment mechanism 23 of FIG. 1. Thus, if the second head 34*b* of a particular fastener 12*a* is driven into the object 52, the adjustment mechanism 23 is used to reduce the amount of force applied to the fastener 12*a* by the actuation component 20.

With continued reference to the magazine 14 shown in FIG. 3A, the first channel 30*a* and the second channel 30*b* extend a length of the magazine 14 for guiding the heads 34*a*, 34*b* of the fasteners 12*a* to the nose section 17 along paths depicted by Arrow B and Arrow C, respectively. The magazine 14 is formed to include a variety of surfaces that define the first and second channels 30*a*, 30*b* for the fastener strip 12 to slidably guide along (see e.g., FIGS. 6A-8B). For example, perimeter portions of the first heads 34*a* of the strip of fasteners 12 guide along a primary guide surface 56*a* of the magazine 14, and, likewise, perimeter portions of the second heads 34*b* of the strip of fasteners 12 guide along a secondary guide surface 56*b* of the magazine 14. Primary and secondary guide surfaces 56*a*, 56*b* at least partially define the first and second channels 30*a*, 30*b*, respectively. Moreover, perimeter portions of the secondary shank 32*b* of strip of the fasteners 12*a* guide along a support surface 58 of the magazine 14; the support surface 58 is an outer surface of the support portion 38 that extends a length of the magazine 14 between the first and second channels 30*a*, 30*b* (FIG. 6A). In some aspects, the primary guide surface 56*a*, the secondary guide surface 56*b*, and the support surface 58 are each formed to have a planar surface that is substantially parallel to a central axis of each fastener 12*a*. This helps the fastener strip 12 to slide along the magazine 14 without encumbrances and without becoming jammed in the channels, which is important for safe and reliable operation of the automatic fastening device.

Advantageously, a single-headed fastener 60 (and strips of such fasteners) is receivable in either the first channel 30*a* or the second channel 30*b*. FIG. 3A shows the head of the single-headed fastener 60 slidably engaged to the first channel 30*a*. Thus, the magazine 14 is formed to guide and supply single-headed fasteners 60 and double-headed fasteners 12*a* to the nose section 17, depending upon the particular application.

FIG. 4 shows the receiving component 28 of FIG. 3A. The receiving component 28 is attached to the receiving end 26 of the magazine 14 and includes an opening 44 that receives the fasteners 12*a* for insertion into the magazine 14. The opening 44 is sized to receive both single and double-headed fasteners 12*a*, 60. The opening 44 includes a first slot 62*a* to receive the first head 34*a* of the fastener 12*a*, and a second slot 62*b* to receive the second head 34*b* of the same fastener 12*a*. The first slot 62*a* is sized to correspond at least partially to the size of the first channel 30*a*, and the second slot 62*b* is sized to correspond at least partially to the size of the second channel 30*b*. A primary shank slot 64*a* extends from the second slot 62*b* along a length of the receiving component 28 to receive a primary shank 32*a* of the fastener 12*a*. A secondary shank slot 64*b* extends between the first slot 62*a* and the second slot 62*b* to allow passage of a secondary shank 32*b* of a fastener 12*a*. The secondary shank slot 64*b* is sized to at least partially correspond to the support portion 38 that protrudes between the first channel 30*a* and the second channel 30*b*. One purpose of the particular shape and size of the opening 44 is to ensure proper orientation of the fasteners 12*a* as they are received by the first and second channels 30*a*, 30*b* of the magazine 14 and guided toward the nose section 17. In other embodiments, the opening 44 includes an opening having only a single slot that is sufficiently wide and long enough to receive double-headed fasteners 12.

FIG. 5 shows a side view of the nose section 17 of FIG. 3A. The nose section 17 of the automatic fastening device 10 that is attached to the supply end 24 of the magazine 14 and includes an opening 46 that receives the fasteners 12 from the magazine 14. The opening 46 is sized to receive either single or and double-headed fasteners 12. The opening 46 includes a first slot 66*a* to receive the first head 34*a* of the fastener 12*a* and a second slot 66*b* to receive the second head 34*b* of the same fastener 12*a*. The first slot 66*a* is sized to correspond exactly to the size and position of the first channel 30*a*, and the second slot 66*b* is sized to correspond exactly to the size and position of the second channel 30*b*. A primary shank slot 68*a* extends from the second slot 66*b* along a length of the nose section 17 to receive a primary shank 32*a* of the fastener 12*a*. A secondary shank slot 68*b* extends between the first slot 66*a* and the second slot 66*b* to allow passage of a secondary shank 32*b* of a fastener 12*a*. One purpose of the particular shape and size of the opening 46 is to ensure proper, vertical orientation of the fastener 12*a* in the elongated chamber 48 of the nose section 17 so that the actuation component 20 will impact the fastener 12*a* approximately along a central axis of the fastener 12*a* to ensure accurate, repeatable drivability of the automatic fastening device 10. The dual slots 66*a*, 66*b* are sized to particularly guide the duplex nails into correct alignment with the actuation component 20. The use of two slots 66*a*, 66*b* and a narrow shank receiving region 68*b* ensures that the duplex fastener 12*a* is exactly guided into the correct position and cannot be aligned incorrectly.

FIGS. 6A-8B show magazines having various cross-sectional configurations and areas to guide fasteners 12*a* along said magazines. It will be appreciated that the magazines of FIGS. 6A-8B may include other features, such as the primary and secondary frame portions and other features discussed with reference to FIGS. 1 and 2.

Figure 6B:
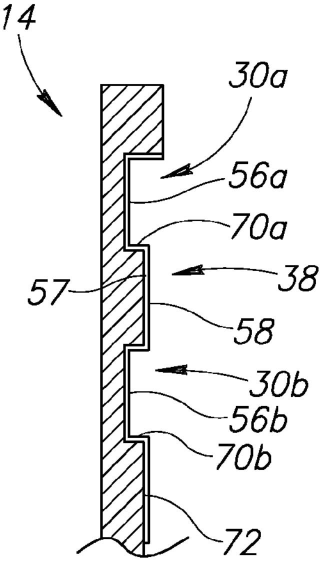
FIG. 6B is a partial cross-sectional view the magazine of FIG. 6A.

FIG. 6A shows a supply end 24 of a magazine 14 having a first channel 30*a* and a second channel 30*b* that receive a first head 34*a* and a second head 34*b*, respectively, of a fastener 12*a*. FIG. 6B shows a partial cross-sectional view of the magazine 14 in a modified version. In the modified version of FIG. 6B, a steel or hard steel liner 57 is positioned on the inside of slots 30*a*, 30*b*. The nails 12*a* are usually made of iron. The magazine 14 is made of aluminum, which will be worn away by the iron nails riding in aluminum the slots 30*a*, 30*b*. Aluminum is lighter in weight and lower cost than an all steel magazine 14. Thus, a preferred compromise is a thin liner 57 that is affixed onto the surface regions of an aluminum magazine 14 where the iron nail might contact the magazine. This provides both light weight and long life. The liner 57 can be made of steel, a steel/nickel alloy, a hardened steel, or other material that is harder and more durable than iron, to extend the life of the magazine 14 for many years.

As previously discussed with reference to FIG. 3A, the magazine 14 is formed to include a variety of surfaces that define the first and second channels 30*a*, 30*b* for the fasteners 12 to slidably guide along. With particular reference to FIG. 6B, the first channel 30*a* of the magazine 14 is defined by the liner 57 having a primary guide surface 56*a* and a primary head surface 70*a* formed perpendicular to each other. A radial perimeter portion of the first head 34*a* of the fastener 12*a* is slidably engaged to the primary guide surface 56*a*. A lower portion of the first head 34*a* of the fastener 12*a* is slidably engaged to the primary head surface 70*a*. Similarly, the second channel 30*b* of the magazine 14 is defined by the liner 57 having a secondary guide surface 56*b* and a secondary head surface 70*b* formed perpendicular to each other. A radial perimeter portion of the second head 34*b* of the fastener 12*a* is slidably engaged to the secondary guide surface 56*b*, and a lower planar portion of the second head 34*b* of the fastener 12*a* is slidably engaged to the secondary head surface 70*b*.

The magazine 14 includes a shank support portion 38 covered by liner 57 that extends from the planar surfaces of the primary guide surface 56*a* and the secondary guide surface 56*b*. The support portion 38 includes a support surface 58 that extends a length of the magazine 14 between the first and second channels 30*a*, 30*b*. A radial perimeter portion of the secondary shank 32*b* of the fastener 12*a* is slidably engaged to the support surface 58. As can be appreciated from FIG. 6A, at least a portion of the first head 34*a* is positioned within the first channel 30*a* and at least a portion of the second head 34*b* is position within the second channel 30*b*.

In some aspects, the magazine 14 includes a shank surface 72 that is an elongated surface parallel to the support surface 58. The shank surface 72 is the surface that may be slidably engaged to by a radial portion of the primary shank 32*a* of the fastener 12*a* to provide additional stability to the fastener 12*a* as it slides along the magazine 14.

Figure 7A:
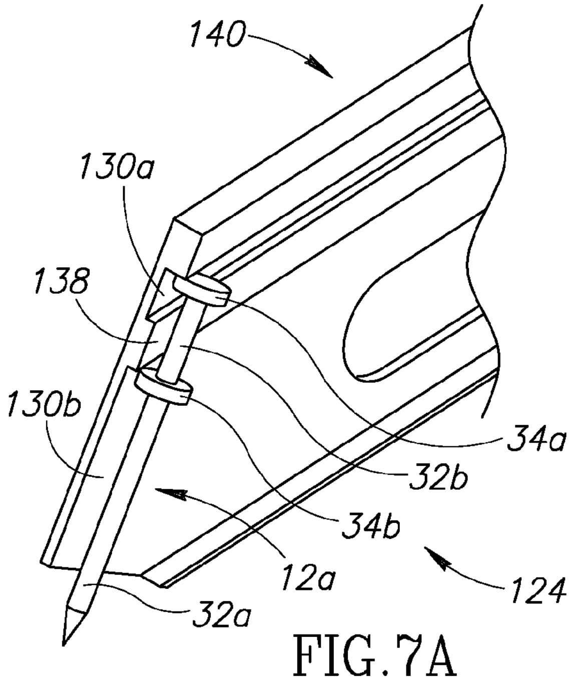
FIG. 7A is a partial isometric view a magazine according to an embodiment of the present disclosure.

FIG. 7A shows a supply end 124 of a magazine 140 having a first channel 130*a* and a second channel 130*b* that receive a first head 34*a* and a second head 34*b*, respectively.

Figure 7B:
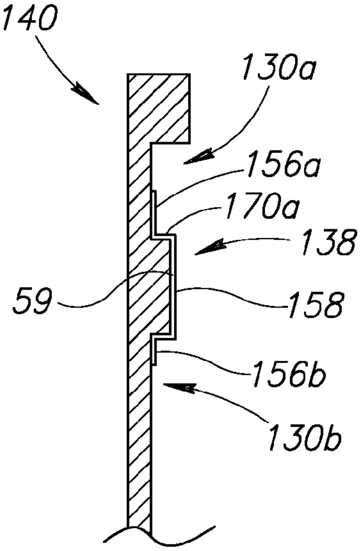
FIG. 7B is a partial cross-sectional view the magazine of FIG. 7A.

FIG. 7B shows an alternative embodiment to FIG. 7A in which a liner 59 is provided, shown in a partial cross-sectional view of the magazine 140. In this embodiment, the second channel 130*b* is an elongated channel without a secondary head surface as discussed with reference to FIGS. 6A and 6B. With particular reference to FIG. 7B, the first channel 130*a* of the magazine 140 is partially defined by a liner 59 on a primary guide surface 156*a* and a primary head surface 170*a* that are formed perpendicular to each other. A radial perimeter portion of the first head 34*a* of the fastener 12*a* is slidably engaged to the primary guide surface 156*a*. A lower portion of the first head 34*a* of the fastener 12*a* is slidably engaged to the primary head surface 170*a*. Similarly, the second channel 130*b* of the magazine 140 is partially defined by a secondary guide surface 156*b*. A radial perimeter portion of the second head 34*b* of the fastener 12*a* is slidably engaged to the secondary guide surface 156*b*.

The magazine 140 includes a support portion 138 of the liner 59 that extends from the planar surfaces of the primary guide surface 156*a* and the secondary guide surface 156*b*. The support portion 138 includes a support surface 158 that extends a length of the magazine 140 between the first and second channels 130*a*, 130*b*. A radial perimeter portion of the secondary shank 32*b* of the fastener 12*a* is slidably engaged to the support surface 158. As can be appreciated from FIG. 7A, at least a portion of the first head 34*a* is positioned in the first channel 130*a*, and at least a portion of the second head 34*b* is position in the second channel 130*b*. The secondary shank 32*b* of the fastener 12*a* is slidably engaged to the support portion 138 to provide additional stability and guidability as the fastener 12*a* slides along the magazine 140. This particular shape is light in weight and yet guides the duplex nails 12*a* properly. In the alternative of 7B, the liner 59 is lighter in weight and covers less area that the liner 57 of FIG. 6B. The liner of 7B is located at those positions where either of the heads or the shank of duplex nail 12*a* may contact.

Figure 8A:
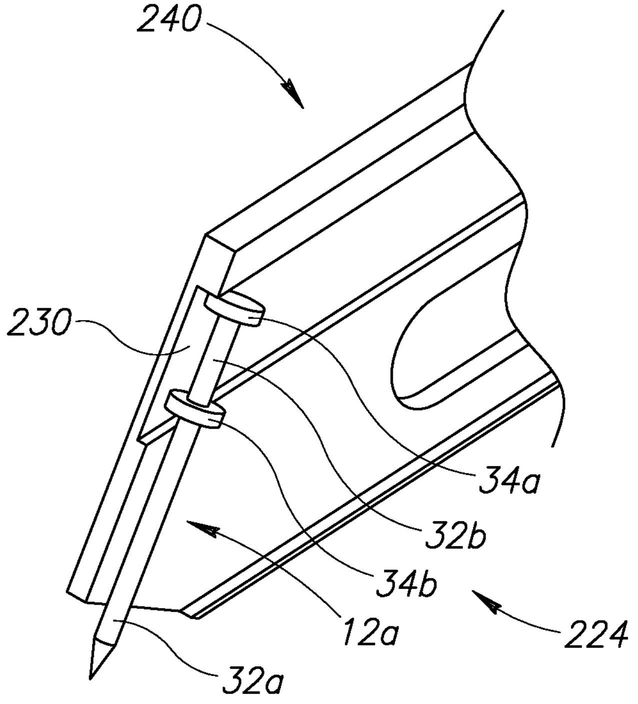
FIG. 8A is a partial isometric view a magazine according to an embodiment of the present disclosure.
Figure 8B:
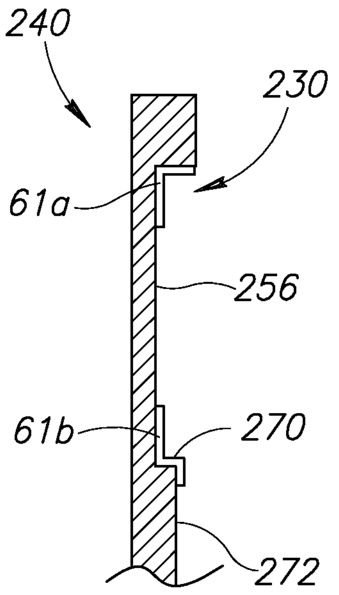
FIG. 8B is a partial cross-sectional view the magazine of FIG. 7A.

FIG. 8A shows a supply end 224 of a magazine 240 having a channel 230 that receives both a first head 34*a* and a second head 34*b* of a fastener 12*a*. FIG. 8B shows an alternative partial cross-sectional view of the magazine 240. This includes guide corners 61*a*, 61*b*. These guide corners 61*a*, 61*b* are present at the two locations that the heads 34*a*, 34*b* contact the magazine 14 to provide a steel contact edge for the iron nails 12*a*. The embodiment of FIGS. 8A and 8B is the lightest in weight since there is no shank contact region in the magazine 14, only an open space. The magazine 14 will still have a long life because in the only place the iron nails 12*a* will contact the magazine 14, strips 61*a*, 61*b* of steel or hardened steel are present.

In this embodiment, the channel 230 is an elongated channel that extends a length of the magazine 240. With particular reference to FIG. 8B, the channel 230 of the magazine 240 is partially defined by a guide surface 256 and a head surface 270 formed perpendicular to each other. Radial perimeter portions of the first head 34*a* and the second head 34*b* of the fastener 12*a* are slidably engaged to the guide surface 256. A lower planar portion of the second head 34*b* of the fastener 12*a* is slidably engaged to the head surface 270. The magazine 240 includes a shank surface 272 that is an elongated surface parallel to the guide surface 256. A radial portion of the primary shank 32*a* of the fastener 12*a* is slidably engaged to the shank surface 272 to provide additional stability to the fastener 12*a* as it slides along the magazine 240.

It will be appreciated that, with any magazine discussed herein, the hardened liner is positioned in both sides of the magazine in those embodiments in which it is used, even though only one side of the magazine is shown in such embodiments of FIGS. 6B, 7B and 8B. Further, one or both of the two channels may be formed as part of a separate component that is removably attached or otherwise attached or secured to the magazine to receive and guide double-headed fasteners. For example, existing magazines only have one elongated channel to receive the head of a single-headed fastener. A second channel could be provided by attaching a separate, elongated member to the magazine and adjacent and parallel to the one elongated channel so that double-headed fasteners may be used with the magazine.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a driving mechanism having an actuation component for driving each of a plurality of fasteners, each fastener having a single shaft with a first head and a second head connected to the single shaft; and a magazine attached to the driving mechanism, the magazine having an outlet end adjacent the driving mechanism and an inlet end at an opposite end, spaced from the outlet end, the outlet end configured to output each of the plurality of fasteners to the driving mechanism;

a first channel located inside the magazine and extending from the outlet end to the inlet end along a first direction; a second channel spatially separated a selected distance from the first channel in a direction generally perpendicular to the first direction and extending from the outlet end to the inlet end in the first direction, the first channel being positioned to receive the first head of each of the plurality of fasteners and the selected distance for the second channel being of the distance to receive the second head of the same fastener for each of the plurality of individual fasteners;

a fastener receiving component attached to the inlet end of the magazine, the fastener receiving component having an opening with a first slot and a second slot, the first slot in communication with the first channel of the magazine and the second slot in communication with the second channel of the magazine, the fastener receiving component receiving the fastener with the single shaft and having the first head and the second head connected to the single shaft; and a nose section having only a single elongated opening that extends from a top region of the nose section to a bottom region of the nose section, the single elongated opening having four different sections of different widths spaced apart from each other along the length thereof, a first width that is sufficiently wide to permit the first head of the nail of the fastener to pass therethrough, a second width that is too narrow to permit the first head of the nail to pass therethrough but is sufficiently wide to permit the single shaft to pass therethrough, a third width that is sufficiently wide to permit the second head of the nail of the fastener to pass therethrough, and a fourth width to permit the shaft of the nail below the second head to pass therethrough but is too narrow to permit the second head of the nail to pass therethrough, the nose section being coupled to the outlet end of the magazine and being directly adjacent to and feeding the actuation component of the driving mechanism, the nose section having the first width aligned with the first channel of the magazine and that receives the first head of the fastener and the third width aligned with the second channel and that receives the second head of the same fastener.

2. The device of claim 1 wherein the magazine includes a support portion disposed between the first and second channels, the support portion positioned between the first channel and the second channel and extending from the inlet end to the outlet end of the magazine and prohibiting either the first head or the second head from entering the support portion.

3. The device of claim 1, comprising a fastener supply component attached to the inlet end of the magazine, the fastener supply component having an opening that receives the fastener for insertion into the magazine.

4. The device of claim 1, comprising a fastener receiving component attached to the inlet end of the magazine, the fastener receiving component having an opening that receives the first head and the second head of the fastener from the magazine.

5. The device of claim 1 wherein the driving mechanism includes an adjustable mechanism operable to control an amount of force applied by the actuation component against the fastener such that the first head extends from a surface of the object for removal of the fastener from the object and the second head is in direct contact with and abutting the object.

6. The device of claim 1 further including a nose section in the driving mechanism having two inlet slots that match with the first channel and the second channel.

7. The device of claim 1 in which the actuation component is positioned to impact only the first head of the fastener and not the second head of the fastener.

8. A device, comprising:

a driving mechanism having an actuation component for driving a fastener that has a single shaft with a first head and a second head connected to the same single shaft; a magazine attached to the driving mechanism and that receives the fastener, the magazine having an outlet end adjacent the driving mechanism and an inlet end spaced from the outlet end;

a first channel located inside the magazine and extending from the outlet end to the inlet end along a first direction;

a second channel spatially separated a selected distance from the first channel in a direction generally perpendicular to the first direction; the first channel being positioned to receive a first head of the fastener and the selected distance for the second channel being of the distance to receive a second head of the same fastener;

a fastener receiving component attached to the inlet end of the magazine, the fastener receiving component having an opening with a first slot and a second slot, the first slot in communication with the first channel and the second slot in communication with the second channel, wherein the fastener inlet component receives the fastener with the single shaft and having the first head and the second head connected to the same single shaft and provides the fastener into the magazine and the magazine advances the fastener to the driving mechanism that is adjacent the actuation component for driving the fastener out from the device and into an object; and a nose section having only a single elongated opening that extends from a top region of the nose section to a bottom region of the nose section, the single elongated opening has three different widths spaced apart from each other along the length thereof, a first width that is sufficiently wide to permit the first head of the nail of the fastener to pass therethrough, a second width that is too narrow to permit the first head of the nail to pass there through but is sufficiently wide to permit the single shaft to pass therethrough and a third width that is sufficiently wide to permit the second head of the nail of the fastener to pass therethrough, the nose section being coupled to the outlet end of the magazine and being directly adjacent to and feeding the actuation component of the driving mechanism, the nose section having the first width aligned with the first channel of the magazine and that receives the first head of the fastener and the third width aligned with the second channel and that receives the second head of the same fastener.

9. The device of claim 8 wherein the driving mechanism includes an adjustable mechanism operable to control an amount of force applied by the actuation component against the fastener such that the first head extends from a surface of the object for removal of the fastener from the object and the second head is in direct contact with and abutting the object.

10. The device of claim 1 wherein the first and third width are the same width as each other and the second and fourth width are the same as each other.

* * * * *